US 7,143,274 B2

(12) United States Patent
Sakamoto

(10) Patent No.: US 7,143,274 B2
(45) Date of Patent: Nov. 28, 2006

(54) SETTING BREAKPOINT FOR POSTPONED INTERRUPT PROCESSING IN SUBSEQUENT AREA WHILE EXECUTING INTERRUPT-EXCLUSIVE TASK AREA TO AVOID SLOW DOWN

(75) Inventor: Mamoru Sakamoto, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 427 days.

(21) Appl. No.: 10/674,529

(22) Filed: Oct. 1, 2003

(65) Prior Publication Data
US 2004/0181793 A1 Sep. 16, 2004

(30) Foreign Application Priority Data
Mar. 12, 2003 (JP) ............................. 2003-066292

(51) Int. Cl.
*G06F 9/48* (2006.01)
(52) U.S. Cl. ....................... 712/244; 710/262; 718/102
(58) Field of Classification Search .................... None
See application file for complete search history.

(56) References Cited

U.S. PATENT DOCUMENTS 6,182,208 B1* 1/2001 Peri et al. .................. 712/227
6,629,180 B1* 9/2003 Attimont et al. ............ 710/262
6,832,338 B1* 12/2004 Casper et al. ................ 714/35
7,003,610 B1* 2/2006 Yang et al. ................. 710/260

FOREIGN PATENT DOCUMENTS

JP 2002-73350 3/2002

* cited by examiner

*Primary Examiner*—Kenneth S. Kim
(74) *Attorney, Agent, or Firm*—Oblon, Spivak, McClelland, Maier & Neustadt, P.C.

(57) ABSTRACT

An interrupt controlling method is provided that is capable of executing an interrupt process while avoiding slowing-down in execution speed of a task process. When an interrupt request occurs while a task processing program is being executed, the task processing program is suspended and execution of an interrupt handler is started. By the interrupt handler, a plurality of breakpoints are set in an interrupt process-enabled area (R2). Execution of the resumed task processing program soon reaches one of the plurality of breakpoints. Then, the microprocessor (1) suspends the execution of the task processing program and starts execution of a breakpoint handler. By the breakpoint handler, the interrupt process is executed, and thereafter, the settings of the breakpoints are cleared.

19 Claims, 16 Drawing Sheets

F I G. 3 0
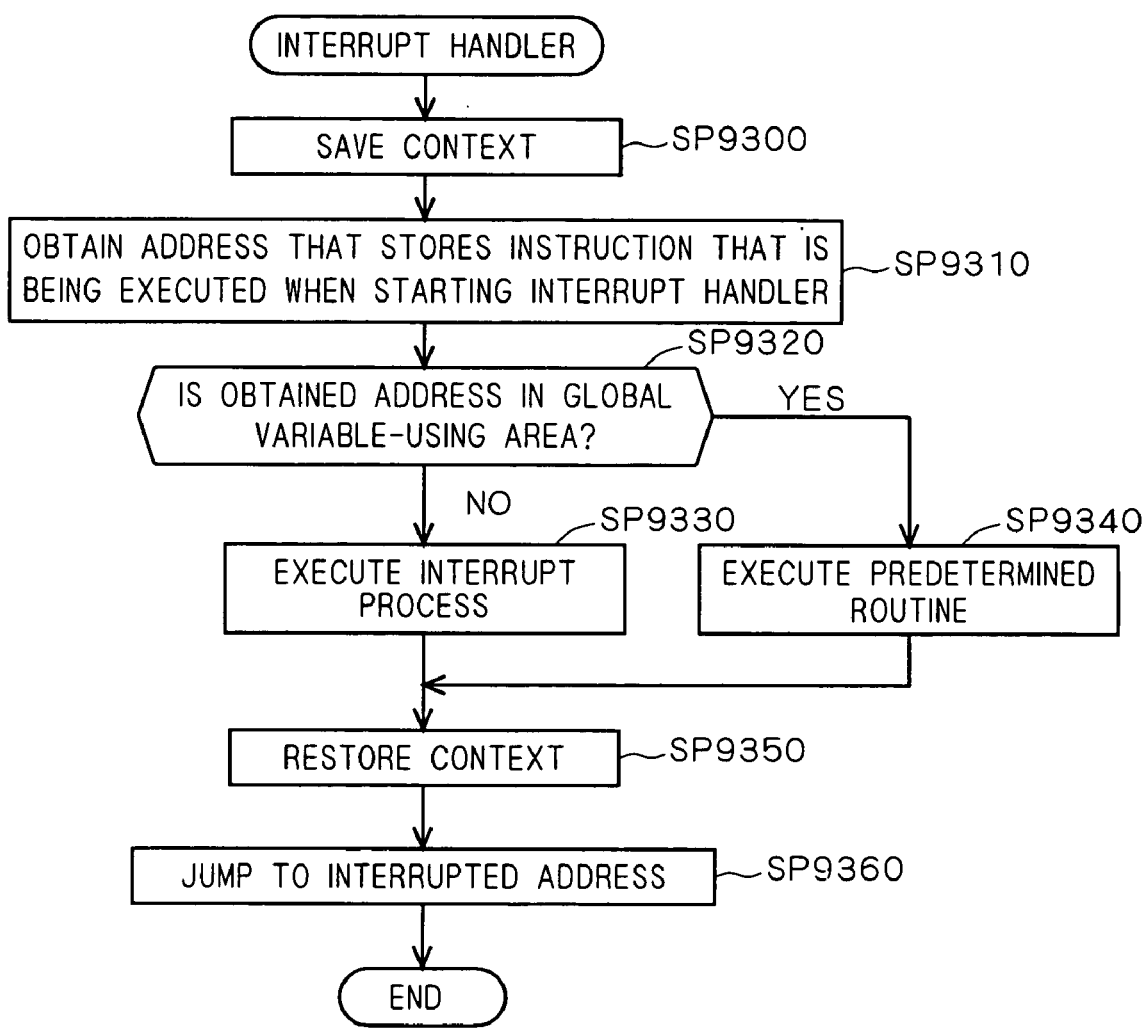

SETTING BREAKPOINT FOR POSTPONED INTERRUPT PROCESSING IN SUBSEQUENT AREA WHILE EXECUTING INTERRUPT-EXCLUSIVE TASK AREA TO AVOID SLOW DOWN

BACKGROUND OF THE INVENTION

1. Field of the Invention

The present invention relates to an interrupt controlling method.

2. Description of the Background Art

In order to execute a task process and an interrupt process exclusively of one another, conventional interrupt controlling devices have adopted a technique of switching the start of an interrupt handler between enablement and disablement by using an interrupt mask.

Specifically, before starting to execute a first task process that is necessary to be executed exclusively of interrupt processes, an interrupt mask is set to "disable". Then, after completing the first task process but before starting to execute a second task process, which does not need to be executed exclusively of interrupt processes, the interrupt mask is set to "enable".

Japanese Patent Application Laid-Open No. 2002-73350 discloses a technology related to an interrupt controlling device using an interrupt mask.

In this kind of conventional interrupt controlling device, however, even when an interrupt request does not occur, processes for setting interrupt mask registers are additionally executed other than essential task processes. This causes a problem of slowing-down the execution speed of the task processes.

SUMMARY OF THE INVENTION

It is an object of the present invention to provide an interrupt controlling method that is capable of executing interrupt processes while avoiding slowing-down in execution speed of task processes.

A first aspect of the present invention is intended for an interrupt controlling method of executing an interrupt process while executing a first program, in which instructions for performing a task process are described. According to the first aspect, the interrupt controlling method includes the following steps (a) to (d). The step (a) is, when an interrupt request occurs while the first program, in which first and second areas are defined, is in execution, to suspend the execution of the first program and set at least one breakpoint in the second area. The step (b) is to resume the execution of the first program that has been suspended in the step (a) after the setting of the breakpoint is completed. The step (c) is, when the execution of the first program that has been resumed in the step (b) reaches the breakpoint, to suspend the execution of the first program and execute the interrupt process. The step (d) is to clear the setting of the breakpoint after the execution of the interrupt process is completed.

It is possible to avoid slowing-down in execution speed of the task process because, unless an interrupt request occurs, the task process does not suffer from overheads arising from exclusive control.

A second aspect of the present invention is intended for an interrupt controlling method of executing an interrupt process while executing a first program, in which instructions for performing a task process are described. According to the second aspect, the interrupt controlling method includes the following steps (a) to (e). The step (a) is, when an interrupt request occurs while the first program, in which first and second areas are defined, is in execution, to suspend execution of the first program and obtain an address that stores an instruction that was in execution at the time the first program was suspended. The step (b) is to set a breakpoint in the second area if the address belongs to the first area, but execute the interrupt process if the address belongs to the second area. The step (c) is, subsequent to the step (b), to resume the execution of the first program that has been suspended in the step (a). The step (d) is, if the address belongs to the first area in the step (b), to suspend execution of the first program and execute the interrupt process when the execution of the first program that has been resumed in the step (c) reaches the breakpoint. The step (d) is to clear the setting of the breakpoint after the execution of the interrupt process in the step (f) is completed.

It is possible to avoid slowing-down in execution speed of the task process because, unless an interrupt request occurs, the task process does not suffer from overheads arising from exclusive control.

A third aspect of the present invention is intended for an interrupt controlling method of executing an interrupt process while executing a program, in which instructions for performing a task process including a process of loading a predetermined variable into a register and a process using the register are described. According to the third aspect, the interrupt controlling method includes the following steps (a) to (c). The step (a) is, when an interrupt request occurs while the program, in which first and second areas are defined, is in execution, to suspend the program and obtaining an address that stores an instruction that was in execution at the time the program was suspended. The step (b) is, if the address belongs to the second area, to execute an interrupt process. The step (c) is, if the address belongs to the first area, to replace the predetermined variable with content of the register and execute an interrupt process using the predetermined variable that has been replaced.

It is possible to avoid slowing-down in execution speed of the task process because, unless an interrupt request occurs, the task process does not suffer from overheads arising from exclusive control.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 27 to 30 are flowcharts showing process flows in an interrupt controlling method according to the ninth preferred embodiment of the present invention.

DESCRIPTION OF THE PREFERRED EMBODIMENTS

First Preferred Embodiment

Figure 1:
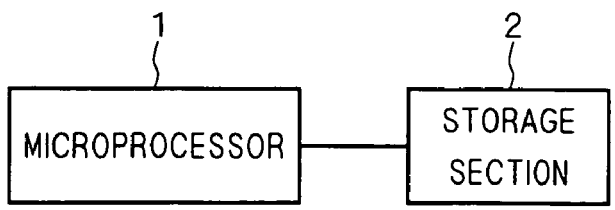
FIG. 1 is a block diagram schematically showing the configuration of an interrupt controlling device according to a first preferred embodiment of the present invention.

FIG. 1 schematically shows an interrupt controlling device according to a first preferred embodiment of the present invention. The interrupt controlling device has a microprocessor 1 and a storage section 2 that can be accessed by the microprocessor 1. The storage section 2 is a semiconductor memory, such as a ROM and a RAM.

Figure 2:
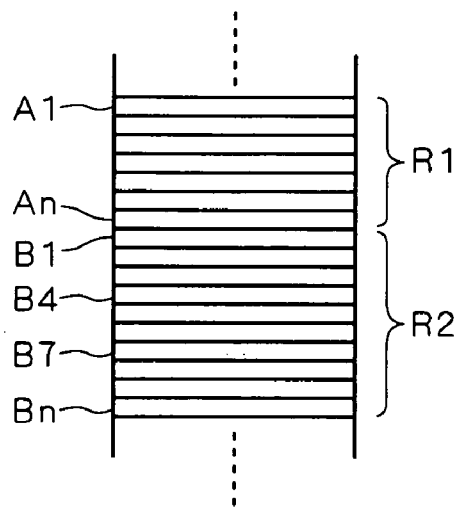
FIG. 2 is a schematic view showing a portion of the storage space selected in part from the storage section.

FIG. 2 is a schematic view showing a portion of a storage space selected in part from the storage section 2. The storage section 2 stores a plurality of instructions that constitute a task processing program, that is, a plurality of instructions for executing a task process. A plurality of instructions that are necessary to be executed exclusively of interrupt processes are stored in addresses A1 to An. Executing the instructions stored in the addresses A1 to An is equivalent to executing a first task process that is necessary to be executed exclusively of interrupt processes. Meanwhile, a plurality of instructions that are not necessary to be executed exclusively of interrupt processes are stored in addresses B1 to Bn. Executing the instructions stored in the addresses B1 to Bn is equivalent to executing a second task process that is not necessary to be executed exclusively of interrupt processes. In reality, the first and the second task processes are often executed repeatedly, but for the sake of simplicity in explanation, the present specification explains the cases where each of the first and the second task processes is executed only one time. It should be noted that, in FIG. 2, each of addresses B4 and B7 stores a branch instruction.

FIGS. 3 to 6 are flowcharts showing process flows of an interrupt controlling method according to the first preferred embodiment. Hereafter, the operation of an interrupt controlling device according to the first preferred embodiment is described with reference to FIGS. 1 to 6.

Figure 3:
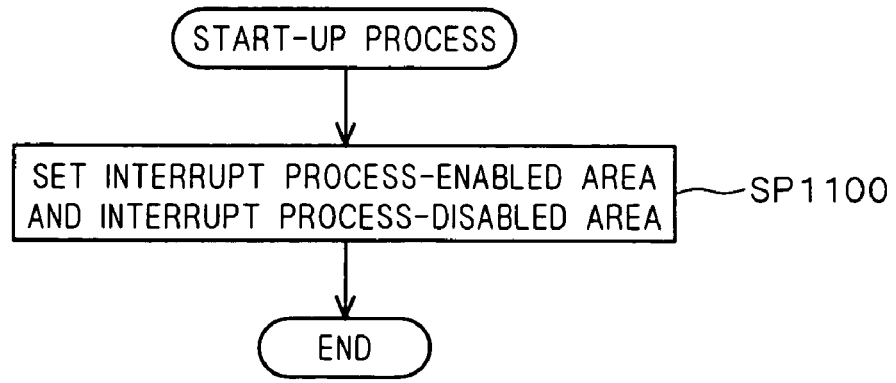
FIGS. 3 to 6 are flowcharts showing process flows in an interrupt controlling method according to a first preferred embodiment of the present invention.

Referring to FIG. 3, first, a start-up process is executed only one time prior to execution of the task processing program. In step SP 1100, the microprocessor 1 sets an interrupt process-enabled area and an interrupt process-disabled area. The decision of which instructions are to be contained in the interrupt process-enabled area and which instruction are to be contained in the interrupt process-disabled area may be made arbitrarily, for example, by the designer of the task processing program at the stage of designing the program. Identification information for identifying the interrupt process-enabled area and identification information for identifying the interrupt process-disabled area are stored in a ROM of the storage section 2 in advance. Specifically, in step SP 1100, the microprocessor 1 performs a process of loading the above-mentioned two identification informations and storing them in a RAM of the storage section 2. As a result of this, the interrupt process-enabled area and the interrupt process-disabled area are defined. In the subsequent processes shown in FIGS. 4 to 6, the identification informations stored in the RAM of the storage section 2 are referred to when it is required to judge whether the instructions constituting the task processing program are in the interrupt process-enabled area or in the interrupt process-disabled area.

Referring to FIG. 2, for example, the identification information that identifies the interrupt process-disabled area is represented by the addresses A1 to An of the instructions that belong to that area, whereas the identification information that identifies the interrupt process-enabled area is represented by the addresses B1 to Bn of the instruction that belong to that area. Alternatively, if the interrupt process-disabled area and the interrupt process-enabled area are made of a plurality of instructions having successive addresses, their identification information may be represented by the respective head addresses and end addresses of the interrupt process-disabled area and the interrupt process-enabled area.

Figure 4:
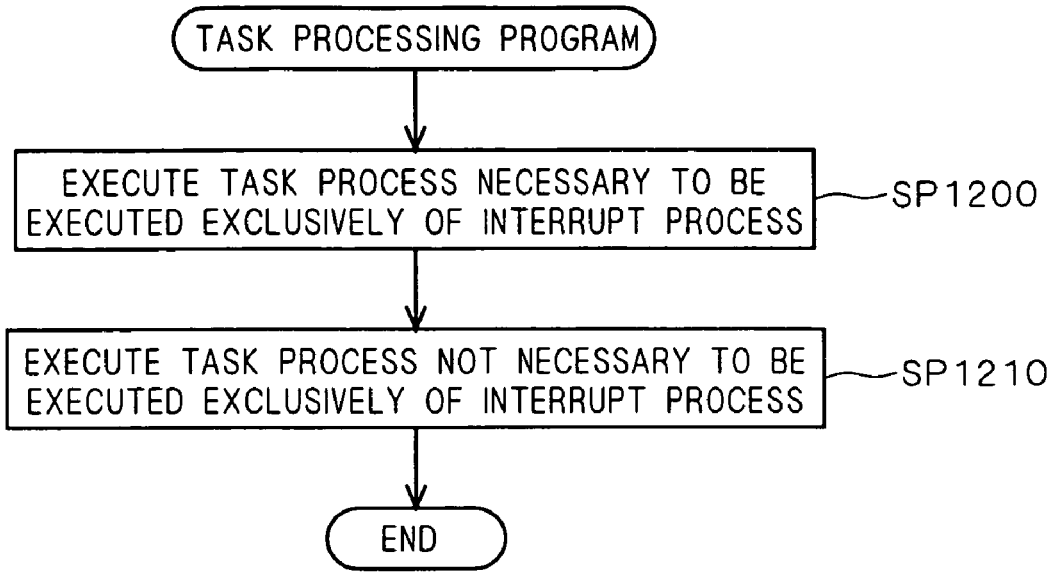

Next, referring to FIG. 4, execution of the task processing program is started. In step SP1200, the microprocessor 1 executes the task process that is necessary to be executed exclusively of interrupt processes. Specifically, the microprocessor 1 sequentially executes the instructions stored in the addresses A1 to An shown in FIG. 2. Next, in step SP 1210, the microprocessor 1 executes the task process that is not necessary to be executed exclusively of interrupt processes. Specifically, the microprocessor 1 sequentially executes the instructions stored in the addresses B1 to Bn shown in FIG. 2.

Assume that, while the microprocessor 1 is executing the task processing program, an external input event is reported to the microprocessor 1 due to expiration of a timer, completion of transmission or reception from a serial communication device, or the like. That is, it is assumed that an interrupt request occurs. Then, the microprocessor 1 suspends the execution of the task processing program and starts to execute an interrupt handler shown in FIG. 5.

Figure 5:
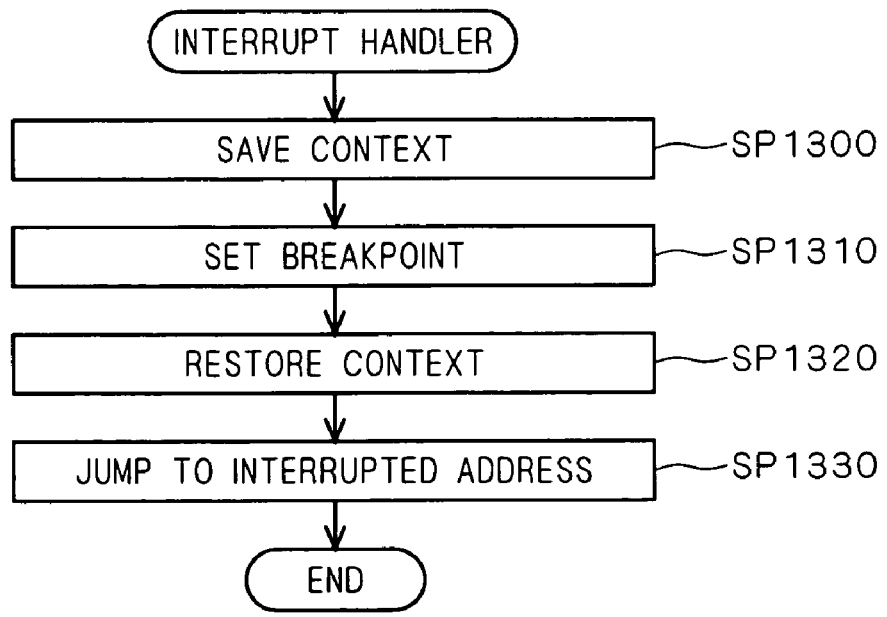

Referring to FIG. 5, in step SP1300, the microprocessor 1 first saves the context in the microprocessor 1 (register values etc.) that is immediately before proceeding to the interrupt handler. Next, in step SP1310, the microprocessor 1 sets a plurality of breakpoints in an interrupt process-enabled area R2. The term "breakpoint" herein means an address at which a predetermined program (the later-described breakpoint handler) starts to be executed when the program in execution reaches the address. In the first preferred embodiment, the microprocessor 1 sets breakpoints at a head address B1 of the interrupt process-enabled area R2, at an end address Bn thereof, and at all the addresses B4 and B7 thereof in which branch instructions are stored. No breakpoint is set in an interrupt process-disabled area R1.

Next, in step SP1320, the microprocessor 1 restores the context that has been saved at step SP1300. Subsequently, in step SP1330, the microprocessor 1 jumps to the interrupted address. In other words, it jumps to an address that stores the instruction that has been executed immediately before proceeding to the interrupt handler. As a result of this, the task processing program, which has been suspended, is resumed.

Referring back to FIG. 4, in step SP1210, execution of the task processing program soon reaches one of the plurality of breakpoints set in step SP 1310 shown in FIG. 5. Herein, it is assumed that it reached a breakpoint BP1 (not shown). Then, the microprocessor 1 suspends the execution of the task processing program and starts to execute a breakpoint handler shown in FIG. 6. Herein, the breakpoint handler is a program that is started when execution of the task processing program reaches a breakpoint.

Figure 6:
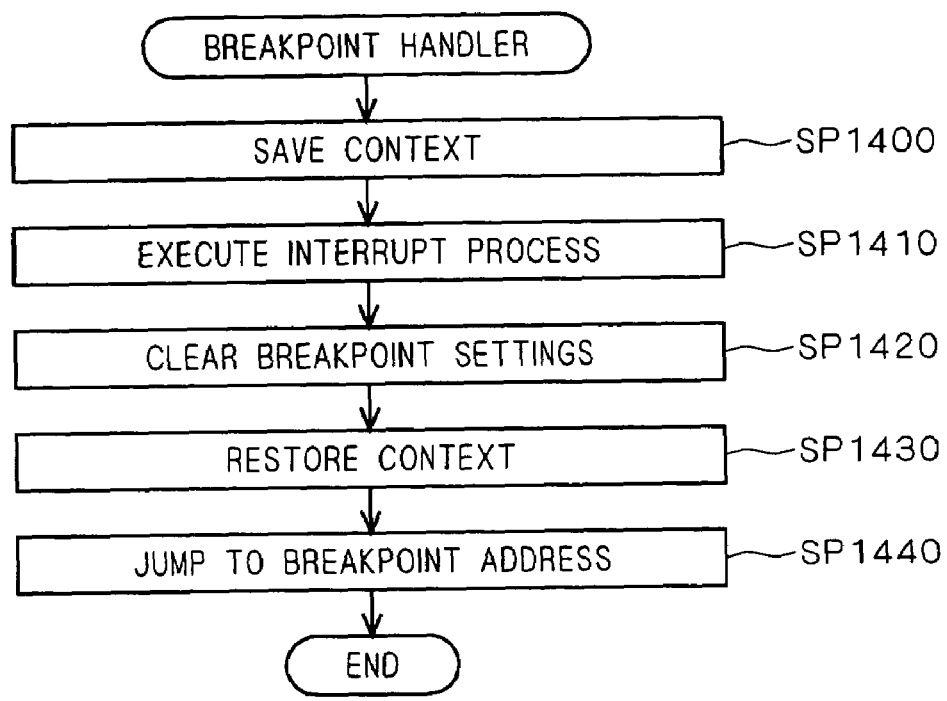

Referring to FIG. 6, in step SP1400, the microprocessor 1 first saves the context of the microprocessor 1 that is immediately before proceeding to the breakpoint handler. Next, in step SP1410, the microprocessor 1 executes an interrupt process that is necessary to be executed exclusively of a task process. Subsequently, in step SP1420, the microprocessor 1 clears all the breakpoint settings. Then, in step SP1430, the microprocessor 1 restores the context that has been saved at step SP1400. Thereafter, in step SP1440, the microprocessor 1 jumps to the address of the breakpoint BP1. This resumes the execution of the task processing program that has been suspended.

Because the breakpoints are not set in the interrupt process-disabled area R1, the breakpoint handler is not called while the instructions in the interrupt process-disabled area R1 are being executed. As a result, the task process that is necessary to be executed exclusively of interrupt processes and the interrupt process that is necessary to be executed exclusively of task processes can be executed exclusively of each other.

Thus, in the interrupt controlling method and the interrupt controlling device according to the first preferred embodiment, no additional processes (such as setting of interrupt masks), which are added to the essential task processes for the purpose of exclusive control, are performed during normal operation in which no interrupt request occurs. Therefore, it is possible to avoid slowing-down in execution speed of the task process because, unless an interrupt request occurs, the task process does not suffer from overheads arising from exclusive control.

In the interrupt controlling method and the interrupt controlling device according to the first preferred embodiment, breakpoints are respectively set at the head address B1 of the interrupt process-enabled area R2, the end address Bn thereof, and all the addresses B4 and B7 thereof in which branch instructions are stored. The start of executing the interrupt process is delayed for a period from the time when the task processing program is resumed after the breakpoints have been set until the time when the execution of the task processing program reaches one of the breakpoints. However, since branch instructions generally appear at a frequency of one in several instructions, the delay time can be suppressed to the minimum. It should be noted that more breakpoints may be set at addresses other than those in which branch instructions are stored, in order to further suppress the delay time.

Second Preferred Embodiment

Figure 7:
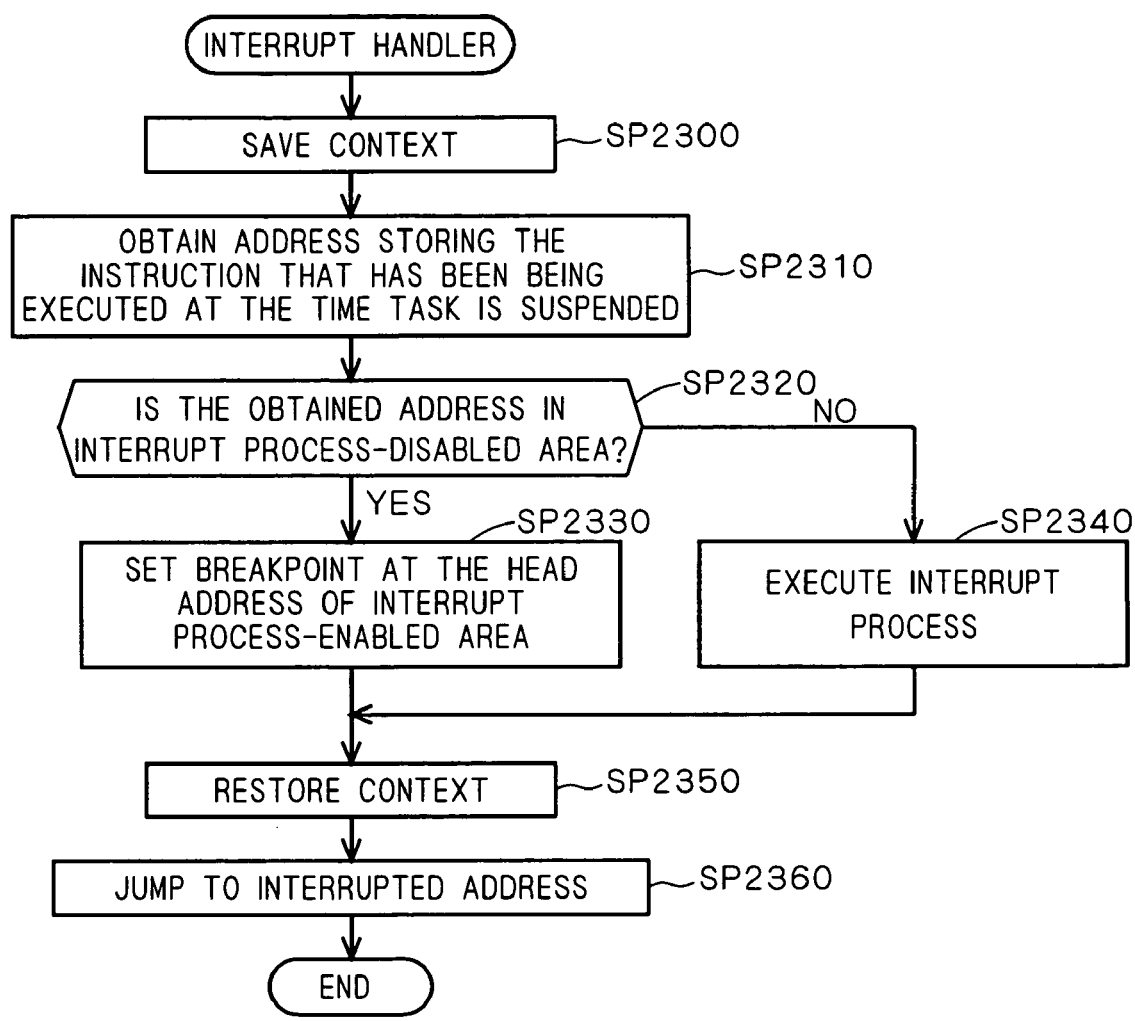
FIG. 7 is a flowchart showing a process flow in an interrupt controlling method according to a second preferred embodiment of the present invention.

FIG. 7 is a flowchart showing a process flow in an interrupt controlling method according to a second preferred embodiment of the present invention. An interrupt controlling device according to the second preferred embodiment executes the process of an interrupt handler shown in FIG. 7, in place of the process of the interrupt handler shown in FIG. 5. Hereafter, the operation of the interrupt controlling device according to the second preferred embodiment is described with reference to FIGS. 1 to 4, 6, and 7.

Referring to FIG. 3, a start-up process is executed first, as in the foregoing first preferred embodiment. Referring to FIG. 4, the task processing program starts to be executed next, also as in the foregoing first preferred embodiment.

It is assumed that an interrupt request occurs while the microprocessor 1 is executing the task processing program. Then, the microprocessor 1 suspends the execution of the task processing program and starts to execute the interrupt handler shown in FIG. 7.

Referring to FIG. 7, in step SP2300, the microprocessor 1 first saves the context in the microprocessor 1 that is immediately before proceeding to the interrupt handler. Next, in step SP2310, the microprocessor 1 obtains an address that stores the instruction that has been executed at the time the task processing program is suspended. Next, in step SP2320, the microprocessor 1 judges whether or not the address obtained in step SP2310 is in the interrupt process-disabled area R1 shown in FIG. 2.

If the result of the judgment in step SP2320 is "YES", that is, if the address obtained in step SP2310 is in the interrupt process-disabled area R1, the process proceeds to step SP2330 and the microprocessor 1 sets a breakpoint only at the head address B1 of the interrupt process-enabled area R2 shown in FIG. 2.

On the other hand, if the result of the judgment in step SP2320 is "NO", that is, if the address obtained in step SP2310 is in the interrupt process-enabled area R2, the process proceeds to step SP2340 and the microprocessor 1 immediately executes the interrupt process corresponding to the interrupt request without executing a breakpoint setting process.

Subsequent to step SP2330 or SP2340, in step SP2350, the microprocessor 1 restores the context that has been saved at step SP2300. Then, in step SP2360, the microprocessor 1 jumps to the interrupted address. This resumes the execution of the task processing program that has been suspended.

If the result of the judgment in step SP2320 was "YES", referring now to FIG. 4, execution of the resumed task processing program soon reaches the breakpoint set at the head address B1 of the interrupt process-enabled area R2. At this time, as in the foregoing first preferred embodiment, an interrupt process is executed by a breakpoint handler shown in FIG. 6.

Thus, in the interrupt controlling method and the interrupt controlling device according to the second preferred embodiment, no additional processes that are added to the essential task processes are performed during normal operation, as in the foregoing first preferred embodiment. Therefore, it is possible to avoid slowing-down in execution speed of the task processes.

In addition, if the address obtained in step SP2310 is in the interrupt process-enabled area R2, the microprocessor 1 immediately executes the interrupt process. For this reason, a delay in starting to execute the interrupt process can be avoided.

Moreover, if the address obtained in step SP2310 is in the interrupt process-disabled area R1, the microprocessor 1 sets a breakpoint only at the head address B1 of the interrupt process-enabled area R2. Therefore, the process for setting breakpoints can be simplified in comparison with the foregoing first preferred embodiment.

Third Preferred Embodiment

Figure 8:
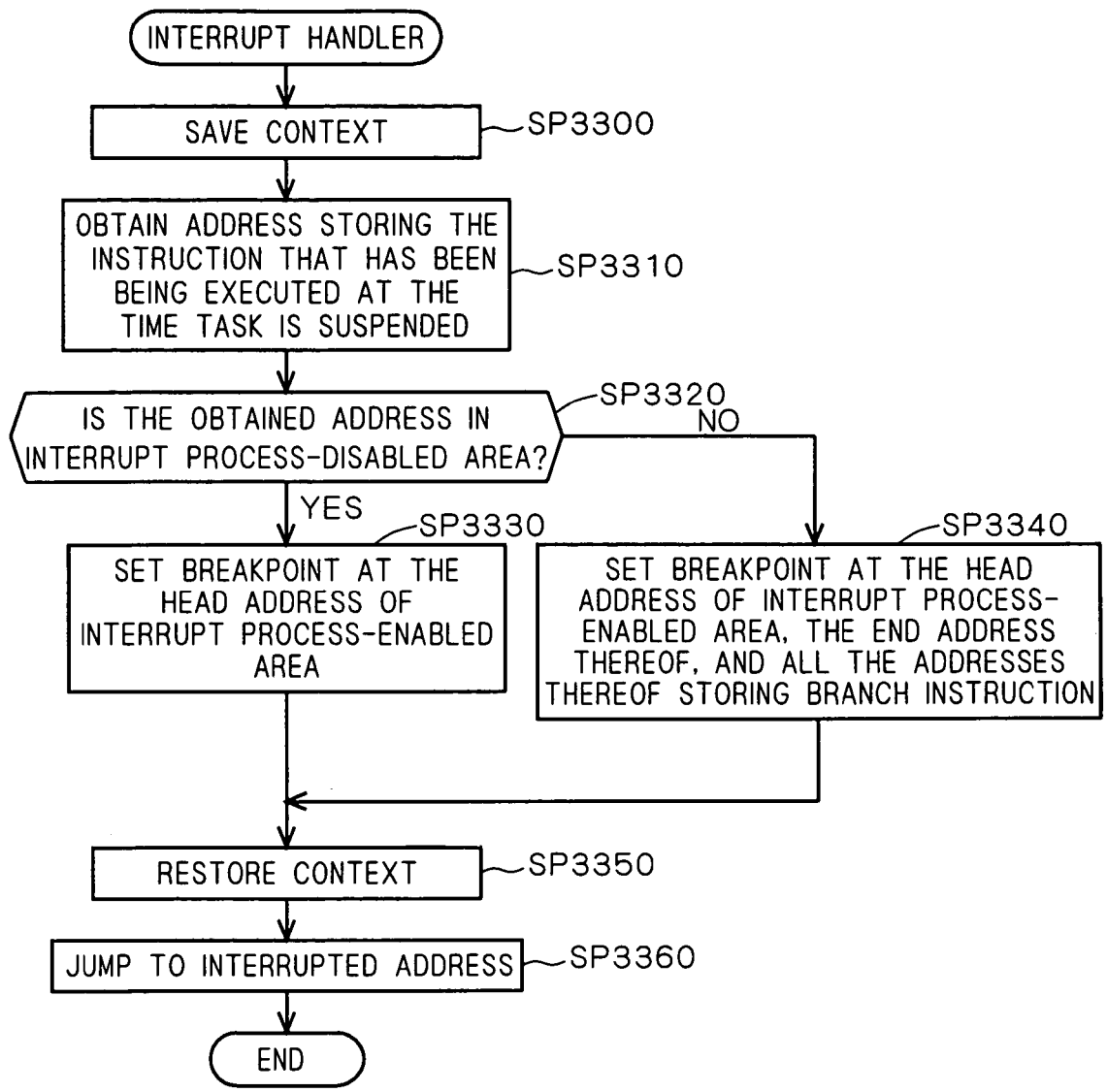
FIG. 8 is a flowchart showing a process flow in an interrupt controlling method according to a third preferred embodiment of the present invention.

FIG. 8 is a flowchart showing a process flow in an interrupt controlling method according to a third preferred embodiment of the present invention. An interrupt controlling device according to the third preferred embodiment executes the process of an interrupt handler shown in FIG. 8, in place of the process of the interrupt handler shown in FIG. 5. Hereafter, the operation of the interrupt controlling device according to the third preferred embodiment is described with reference to FIGS. 1 through 4, 6, and 8.

Referring to FIG. 3, a start-up process is executed first, as in the foregoing first preferred embodiment. Referring to FIG. 4, the task processing program starts to be executed next, also as in the foregoing first preferred embodiment.

It is assumed that an interrupt request occurs while the microprocessor 1 is executing the task processing program. Then, the microprocessor 1 suspends the execution of the task processing program and starts to execute the interrupt handler shown in FIG. 8.

Referring to FIG. 8, the processes of steps SP3300 to SP3320 are executed in a similar manner to the processes of steps SP2300 to SP2320 shown in FIG. 7.

If the result of judgment in step SP3320 is "YES", the process proceeds to step SP3330 and the microprocessor 1 sets a breakpoint only at the head address B1 of the interrupt process-enabled area R2, as in step 2330 shown in FIG. 7.

On the other hand, if the result of the judgment in step SP3320 is "NO", the process proceeds to step SP3340 and the microprocessor 1 sets respective breakpoints at the head address B1 of the interrupt process-enabled area R2, the end address Bn thereof, and all the addresses B4 and B7 thereof in which branch instructions are stored, as in a similar manner to step SP1310 shown in FIG. 5.

Subsequent to step SP3330 or SP3340, the processes of steps SP3350 and SP3360 are executed, as in a similar manner to steps SP2350 and SP2360 shown in FIG. 7.

If the result of the judgment in step SP3320 was "YES", referring now to FIG. 4, execution of the task processing program that has been resumed soon reaches the breakpoint set at the head address B1 of the interrupt process-enabled area R2. Then, as in the foregoing first preferred embodiment, the interrupt process is executed by a breakpoint handler shown in FIG. 6.

If the result of the judgment in step SP3320 is "NO", referring now to FIG. 4, execution of the resumed task processing program soon reaches one of the plurality of breakpoints set at the head address B1 of the interrupt process-enabled area R2, the end address Bn thereof, and all the addresses B4 and B7 thereof, in which branch instructions are stored. Then, as in the foregoing first preferred embodiment, the interrupt process is executed by the breakpoint handler shown in FIG. 6.

Thus, in the interrupt controlling method and the interrupt controlling device according to the third preferred embodiment, the microprocessor 1 sets the breakpoint only at the head address B1 of the interrupt process-enabled area R2 when the address obtained in step SP3310 is in the interrupt process-disabled area R1. Therefore, the process for setting breakpoints can be simplified in comparison with the foregoing first preferred embodiment.

Fourth Preferred Embodiment

In the foregoing first to third embodiments, one or a plurality of breakpoints are set in the interrupt process-enabled area R2. This fourth preferred embodiment describes a first example for setting the breakpoint(s) and for clearing the breakpoint setting. In the fourth preferred embodiment, the storage section 2 shown in FIG. 1 is a memory that is readable and rewritable (RAM).

Figure 9:
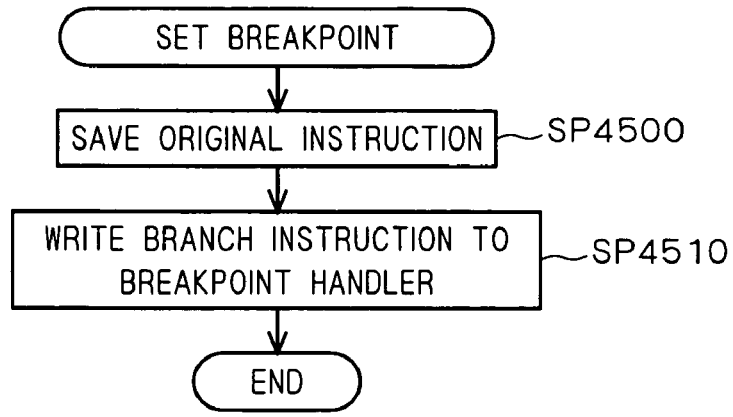
FIG. 9 is a flowchart showing a first example for setting breakpoints.

FIG. 9 is a flowchart showing a first example for setting the breakpoints. In step SP4500, the microprocessor 1 saves an instruction stored in an address at which a breakpoint is to be set (hereinafter referred to as "specific address") into a predetermined area (hereinafter referred to as "specific area") in the storage section 2. Next, in step SP4510, the microprocessor 1 writes, into the specific address, a branch instruction (may be a software trap instruction) for branching to the head address of the breakpoint handler.

Figure 10:
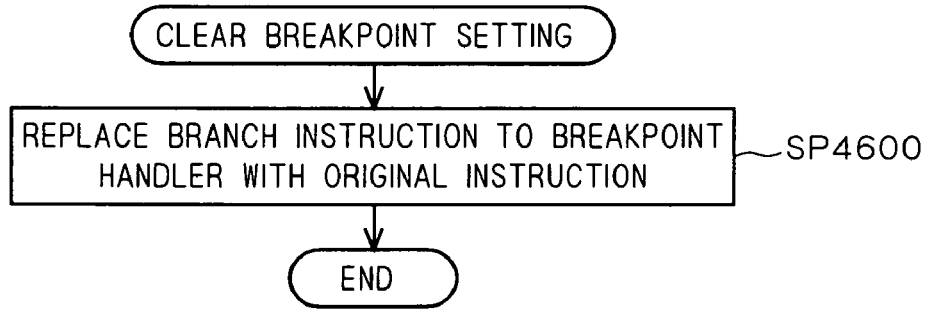
FIG. 10 is a flowchart showing a first example for clearing the breakpoint setting.

FIG. 10 is a flowchart showing a first example for clearing a breakpoint setting. In step SP4600, the microprocessor 1 replaces the branch instruction for branching to the head address of the breakpoint handler that is stored in the specific address with the instruction that has been saved in the specific area in step SP4500.

Thus, with the method of setting a breakpoint according to the fourth preferred embodiment, execution of the task processing program is branched to the head address of the breakpoint handler when it reaches the breakpoint, and therefore, it is possible to start execution of the breakpoint handler reliably.

Moreover, with the method of clearing a breakpoint setting according to the fourth preferred embodiment, the branch instruction for branching to the head address of the breakpoint handler is replaced with the original instruction, and therefore, it is possible to prevent execution of the breakpoint handler from starting after clearing the breakpoint setting.

Fifth Preferred Embodiment

This fifth preferred embodiment describes a second example for setting the breakpoint(s) and for clearing the breakpoint setting.

Figure 11:
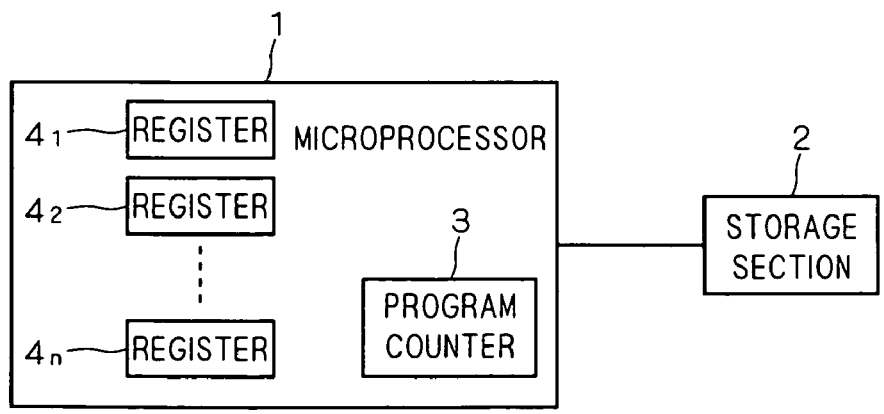
FIG. 11 is a block diagram schematically showing the configuration of an interrupt controlling device according to a fifth preferred embodiment of the present invention.

FIG. 11 is a block diagram schematically showing the configuration of an interrupt controlling device according to the fifth preferred embodiment. The microprocessor 1 has a program counter 3 and registers $4_1$ to $4_n$. The storage section 2 is a memory that is at least readable (ROM or RAM).

Figure 12:
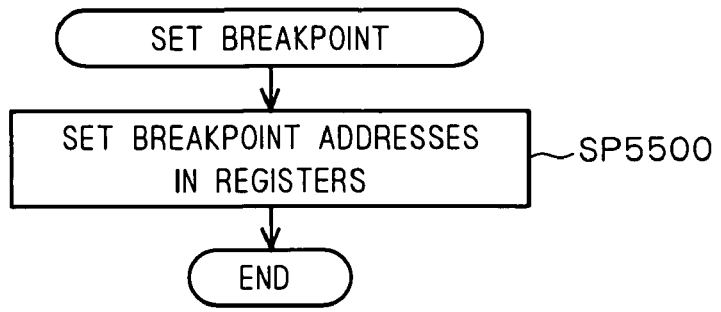
FIG. 12 is a flowchart showing a second example for setting breakpoints.

FIG. 12 is a flowchart showing a second example for setting the breakpoints. In step SP5500, the microprocessor 1 sets, into the registers $4_1$ to $4_n$, specific addresses at which the breakpoints are to be set. The number of registers $4_1$ to $4_n$ that are provided determines how many specific addresses that can be set.

Figure 13:
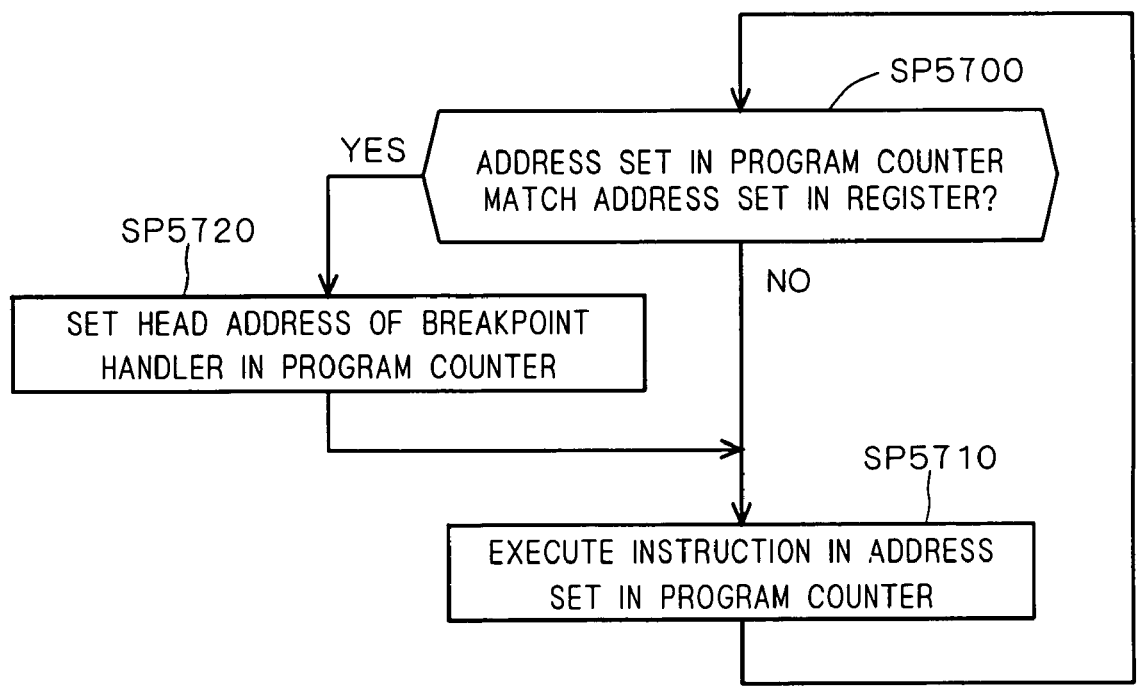
FIG. 13 is a flowchart showing a process flow performed by a microprocessor when a task processing program is being executed.

FIG. 13 is a flowchart showing a process flow performed by the microprocessor 1 when the task processing program is being executed. In step SP5700, the microprocessor 1 sequentially judges whether or not an addresses set in the program counter 3 matches the specific addresses set in the registers $4_1$ to $4_n$.

If the result of the judgment in step SP5700 is "NO", the process proceeds to step SP5710 and the microprocessor 1 executes the instruction stored in the address that is set in the program counter 3. When execution of the instruction is completed, the set value in the program counter 3 is updated. Until the address set in the program counter 3 matches one of the specific addresses set in the registers $4_1$ to $4_n$, the processes of steps SP5700 and SP5710 are repeated. That is, the task processing program is executed.

If the result of the judgment in step SP5700 is "YES", that is, if the address set in the program counter 3 matches one of the specific addresses set in the registers $4_1$ to $4_n$, the process proceeds to step SP5720, the head address of the breakpoint handler is set in the program counter 3. As a result, execution of the breakpoint handler is started in step SP5710, which follows step SP5720.

Figure 14:
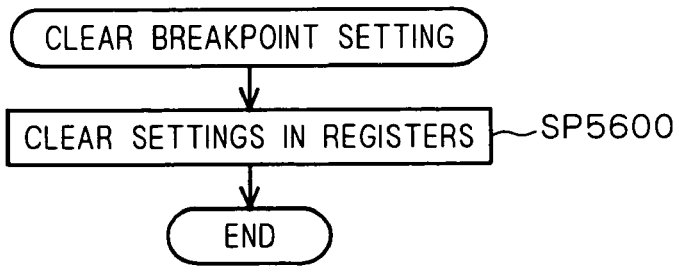
FIG. 14 is a flowchart showing a second example for clearing the breakpoint setting.

FIG. 14 is a flowchart showing a second example for clearing the breakpoint setting. In step SP5600, the microprocessor 1 clears the settings in the registers $4_1$ to $4_n$ by setting the values of all the registers $4_1$ to $4_n$ to be $-1$.

Thus, in the method of setting a breakpoint according to the fifth preferred embodiment, when an address set in the program counter 3 matches one of the specific addresses set in the registers $4_1$ to $4_n$, the head address of the breakpoint handler is set in the program counter 3. This makes it possible to reliably start execution of the breakpoint handler.

Moreover, since the storage section 2 may be a ROM, cost reduction is achieved concerning the storage section 2, in comparison with the foregoing the fourth preferred embodiment.

In addition, with the method of clearing the breakpoint setting, the settings in the registers $4_1$ to $4_n$ are cleared, and therefore, it is possible to prevent execution of the breakpoint handler from starting after clearing the breakpoint setting.

Sixth Preferred Embodiment

This sixth preferred embodiment describes a third example for setting the breakpoint(s) and for clearing the breakpoint setting. In the sixth preferred embodiment, the microprocessor 1 has a function of executing a simulator. The simulator is a program for performing a simulation. In a system having a simulation function, it is customary to provide different microprocessors for a microprocessor executing a simulator and for a microprocessor that undergoes the simulation, but in the sixth preferred embodiment, the microprocessor 1 serves as both of the microprocessors.

Figure 15:
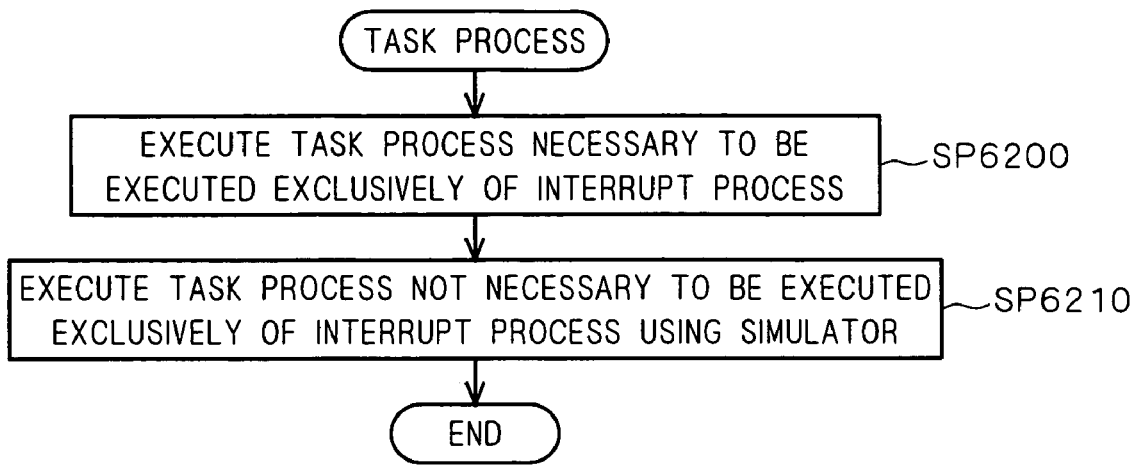
FIG. 15 is a flowchart showing the flow of a task process.

FIG. 15 is a flowchart showing a flow of the task process. As in the foregoing first preferred embodiment, in step SP6200, the microprocessor 1 executes a task process that is necessary to be executed exclusively of interrupt processes, using a task processing program. Next, in step SP6210, the microprocessor 1 executes a task process that is not necessary to be executed exclusively of interrupt processes, using a simulator.

Figure 16:
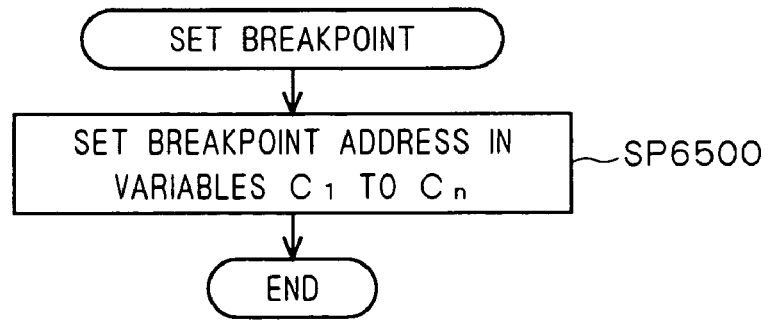
FIG. 16 is a flowchart showing a third example for setting breakpoints.

FIG. 16 is a flowchart showing a third example for setting the breakpoints. In step SP6500, the microprocessor 1 assigns specific addresses at which breakpoints are to be set, to predetermined variables $C_1$ to $C_n$. The number of variables $C_1$ to $C_n$ determines how many specific addresses can be set.

Figure 17:
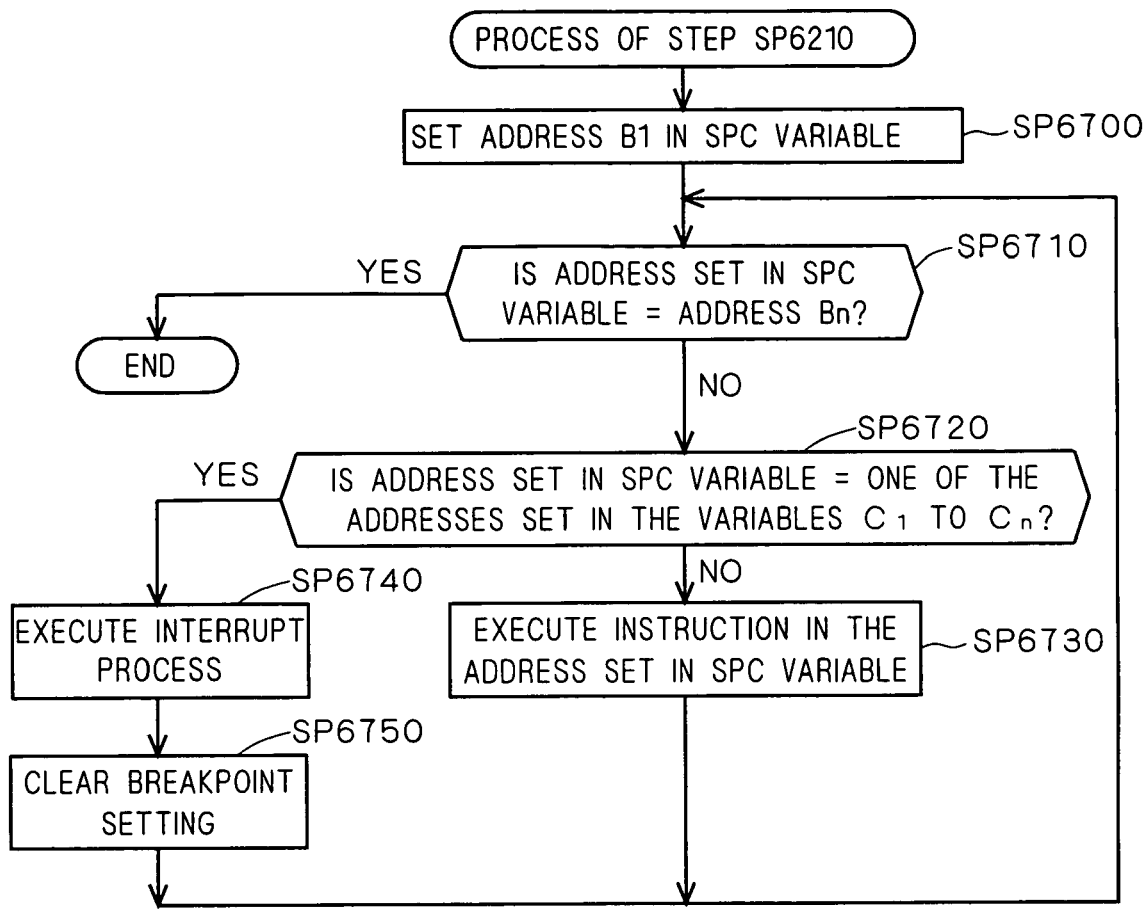
FIG. 17 is a flowchart showing a detailed operation in step SP6210 shown in FIG. 15.

FIG. 17 is a flowchart showing a detailed process of step SP6210 shown in FIG. 15. In step SP6700, a SPC (Simulation Program Counter) variable is set to the head address B1 of the interrupt process-enabled area R2. The SPC variable is a variable that retains an address that stores an instruction that is currently in execution by the simulator. Next, in step SP6710, the microprocessor 1 judges whether or not the address set as the SPC variable matches the end address Bn of the interrupt process-enabled area R2.

If the result of the judgment in step SP6710 is "YES", the process terminates. On the other hand, if the result of the judgment in step SP6710 is "NO", the process proceeds to step SP6720 and the microprocessor 1 sequentially judges whether or not the address set as the SPC variable matches one of the specific addresses set as the variables $C_1$ to $C_n$.

If the result of the judgment in step SP6720 is "NO", the process proceeds to step SP6730 and the microprocessor 1 executes the instruction stored in the address that is set as the SPC variable. When execution of the instruction is completed, the set value of the SPC variable is updated. Thereafter, the judgment in step SP6710 is performed again.

If the result of the judgment in step SP6720 is "YES", that is, if the address set as the SPC variable matches one of the specific addresses set as the variables $C_1$ to $C_n$, the microprocessor 1 suspends the execution of the simulator. Then, in accordance with the procedure shown in FIG. 6, the interrupt process is executed (step SP6740) and the breakpoint setting is cleared (step SP6750). Thereafter, the process returns to execution of the simulator, and the judgment in step SP6710 is performed again.

Figure 18:
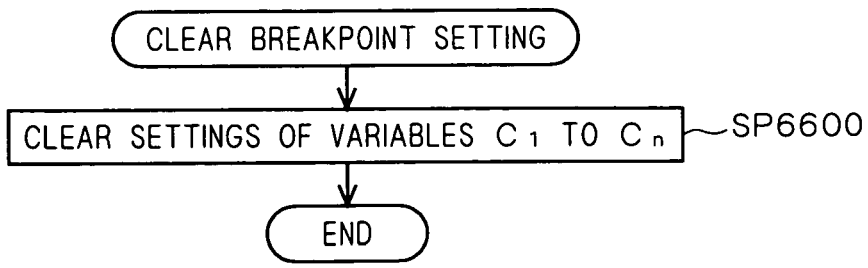
FIG. 18 is a flowchart showing a third example for clearing the breakpoint setting.

FIG. 18 is a flowchart showing a third example for clearing the breakpoint setting, which represents a detailed process content in step 6750 shown in FIG. 17. In step SP6600, the microprocessor 1 clears the settings of variables $C_1$ to $C_n$ by setting the values of all the variables $C_1$ to $C_n$ to $-1$.

In the method of setting the breakpoints according to the foregoing fifth preferred embodiment, the upper limit of the number of the breakpoints that can be set is limited to the number of the registers $4_1$ to $4_n$ that are provided in the microprocessor 1. For this reason, in cases where it is desired to set a large number of breakpoints, it is necessary to provide correspondingly a large number of registers $4_1$ to $4_n$, which increases cost. By contrast, with the method of setting the breakpoints according to the sixth preferred embodiment, the breakpoints can be set within the range of the memory capacity for storing the variables $C_1$ to $C_n$. Therefore, even if it is desired to set a large number of breakpoints, cost increase can be suppressed.

In addition, with the method of clearing a breakpoint setting according to the sixth preferred embodiment, the settings of the variables $C_1$ to $C_n$ are cleared, and therefore, it is possible to prevent execution of the breakpoint handler from starting after clearing the breakpoint setting.

Seventh Preferred Embodiment

This seventh preferred embodiment describes a fourth example for setting the breakpoint(s) and for clearing the breakpoint setting. In the seventh preferred embodiment, the microprocessor 1 has a function of executing a translator. The translator is a program for performing translation (conversion). In a translation operation, a certain instruction is converted into another instruction and the converted instruction is executed. In a system having a translation function, it is customary to execute a translator and the converted instruction with different microprocessors, but in the seventh preferred embodiment, both processes are performed by the microprocessor 1.

Figure 19:
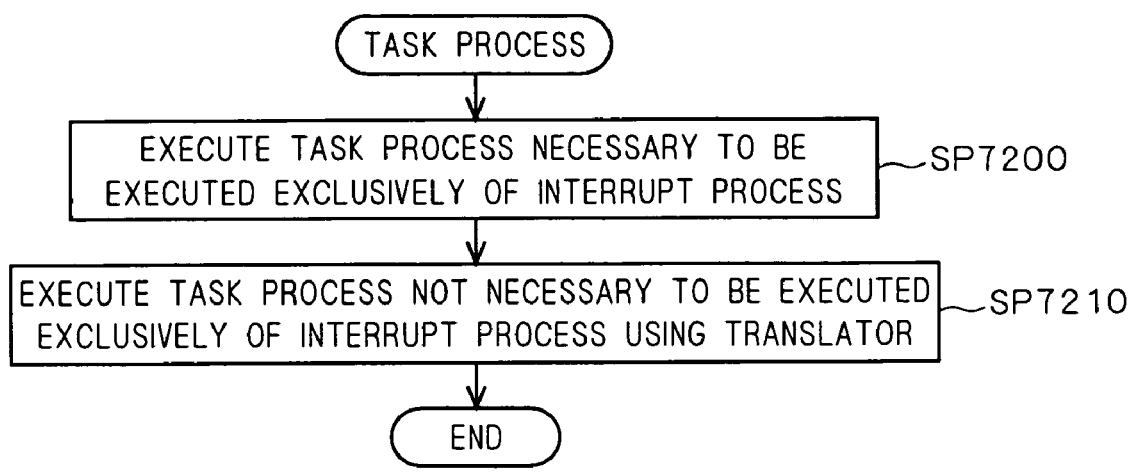
FIG. 19 is a flowchart showing the flow of the task process.

FIG. 19 is a flowchart showing the flow of the task process. As in the foregoing first preferred embodiment, in step SP7200, the microprocessor 1 executes a task process that is necessary to be executed exclusively of interrupt processes, using a task processing program. Next, in step SP7210, the microprocessor 1 executes a task process that is not necessary to be executed exclusively of interrupt processes, using a translator.

Figure 20:
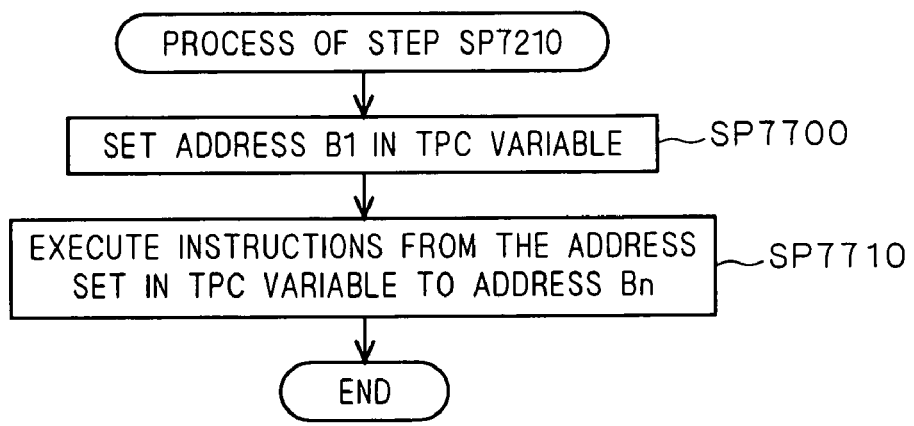
FIG. 20 is a flowchart showing a detailed operation in step SP7210 shown in FIG. 19.

FIG. 20 is a flowchart showing a detailed process in step SP7210 shown in FIG. 19. In step SP7700, a TPC (Translation Program Counter) variable is set to the head address B1 of the interrupt process-enabled area R2. The TPC variable is a variable that retains an address that stores, among a plurality of instructions that constitute the program that is currently in execution by the translator, an instruction that is to be converted at that time. Next, in step SP7710, the microprocessor 1 continues the translation operation until the address set as the TPC variable matches the end address Bn of the interrupt process-enabled area R2.

In the fourth example for setting the breakpoints according to the seventh preferred embodiment, as in the foregoing sixth preferred embodiment, the microprocessor 1 assigns specific addresses in which breakpoints are to be set, to predetermined variables $C_1$ to $C_n$. In the fourth example for clearing the breakpoint setting according to the seventh preferred embodiment, the microprocessor 1 clears the settings in the variables $C_1$ to $C_n$ by setting the values of all the variables $C_1$ to $C_n$ to −1, as in the foregoing sixth preferred embodiment.

Figure 21:
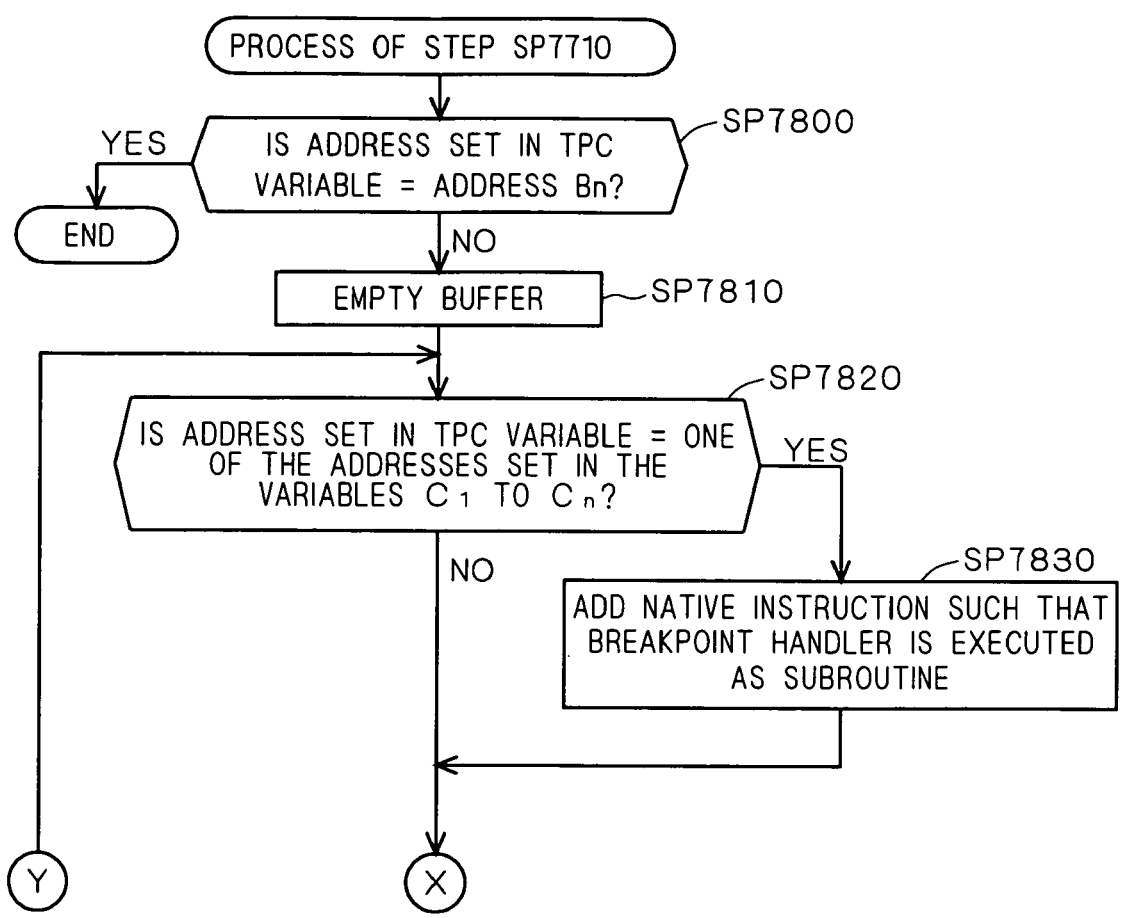
FIGS. 21 and 22 are flowcharts showing detailed operations in step SP7710 shown in FIG. 20.
Figure 22:
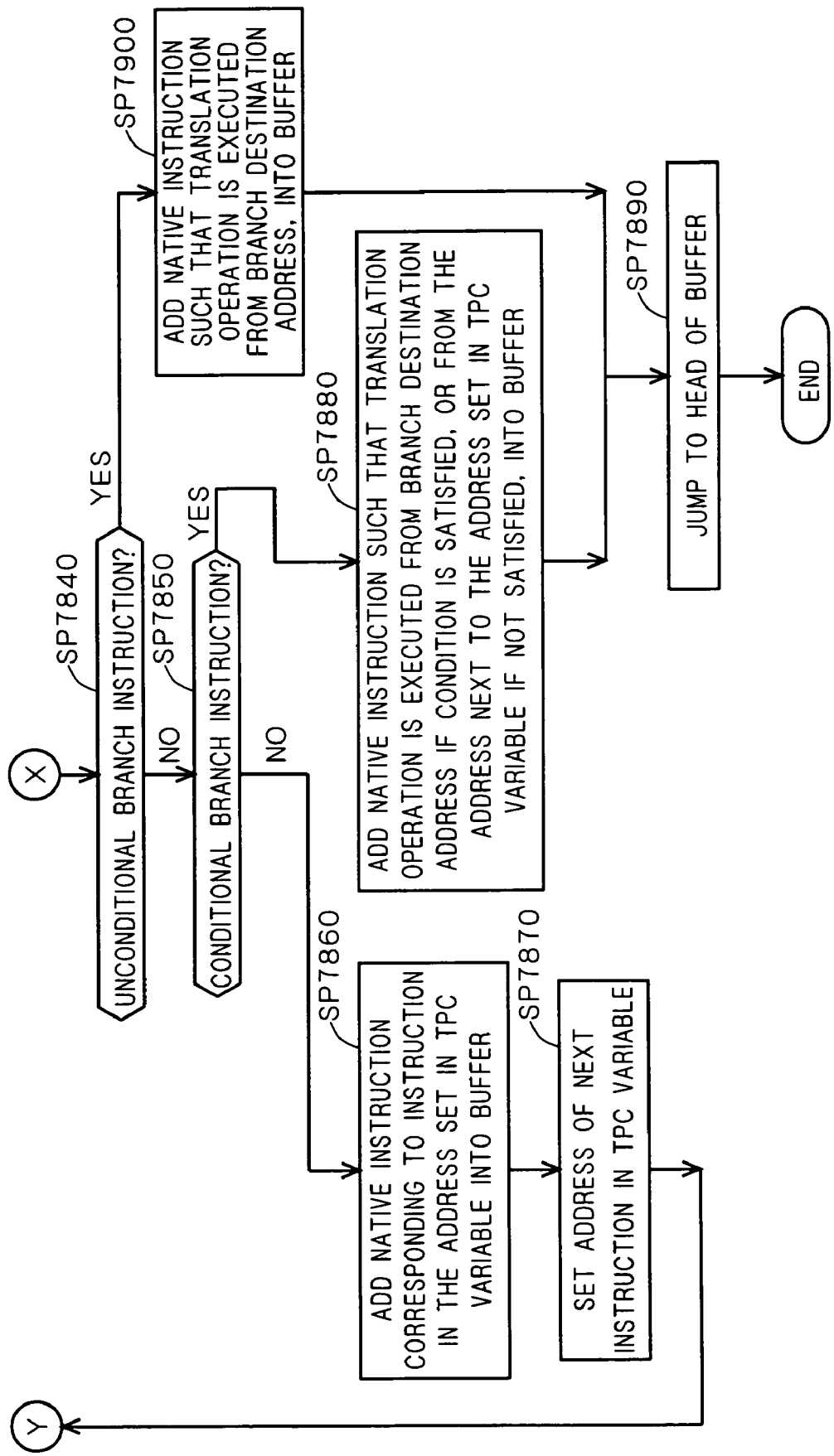

FIGS. 21 and 22 are flowcharts each showing a detailed process of step SP7710 shown in FIG. 20. In step SP7800, the microprocessor 1 judges whether or not the address set as the TPC variable matches the end address Bn of the interrupt process-enabled area R2.

If the result of the judgment in step SP7800 is "YES", the process terminates. On the other hand, if the result of the judgment in step SP7800 is "NO", the process proceeds to step SP7810 and the microprocessor 1 empties the buffer for storing the converted instructions. Next, in step SP7820, the microprocessor 1 sequentially judges whether or not the address set as the TPC variable matches one of the specific addresses set as the variables $C_1$ to $C_n$.

If the result of the judgment in step SP7820 is "YES", that is, if the address set as the TPC variable matches one of the specific addresses set as the variables $C_1$ to $C_n$, the microprocessor 1 generates a native instruction such that the breakpoint handler is executed as a subroutine, and adds the native instruction into the buffer.

Subsequent to step SP7830, and if the result of the judgment in step SP7820 is "NO", the microprocessor 1 judges in step SP7840 whether or not the instruction that is stored in the address set as the TPC variable is an unconditional branch instruction.

If the result of the judgment in step SP7840 is "YES", the process proceeds to step SP7900, in which the microprocessor 1 generates a native instruction such that the translation is executed from the branch destination address, and adds the native instruction to the end of the buffer. This native instruction is such a native instruction that it branches to the head of the translation process. On the other hand, if the result of the judgment in step SP7840 is "NO", the process proceeds to step SP7850 and the microprocessor 1 judges whether or not the instruction that is stored in the address set as the TPC variable is a conditional branch instruction.

If the result of the judgment in step SP7850 is "YES", the process proceeds to step SP7880, in which the microprocessor 1 generates a native instruction and adds the generated native instruction into the buffer, the native instruction being such that the translation operation is executed from the branch destination address when the condition is satisfied, or the translation operation is executed from an address subsequent to the address set as the TPC variable when the condition is not satisfied.

Subsequent to step SP7900 or SP7880, jumping to the head of the buffer is performed in step SP7890. This causes the native instructions that have been stored in the buffer by then to undergo a translation execution. At this time, if the native instruction generated in step SP7830 (that is, a native instruction such as to execute a breakpoint handler) exists in the buffer, the native instruction undergoes the translation execution, whereby the breakpoint handler is executed. That is, an interrupt process is executed. Further, since the instruction for returning to the translation process is stored at the end of the buffer, the process returns to the translation process (to the beginning of FIG. 21) after the translation execution of the native instructions stored in the buffer is completed, and the process continues thereafter.

If the result of the judgment in step SP7850 is "NO", the process proceeds to step SP7860, in which the microprocessor 1 generates a native instruction corresponding to the instruction stored in the address set as the TPC variable, and adds the native instruction to the end of the buffer. Next, in step SP7870, the address in which the next instruction is stored is assigned to the TPC variable. That is, the TPC variable is updated. Thereafter, the judgment in step SP7820 is performed again.

The methods of setting the breakpoints and of clearing the breakpoint setting according to the seventh preferred embodiment can also attain similar effects as those in the foregoing sixth preferred embodiment.

Eighth Preferred Embodiment

Figure 23:
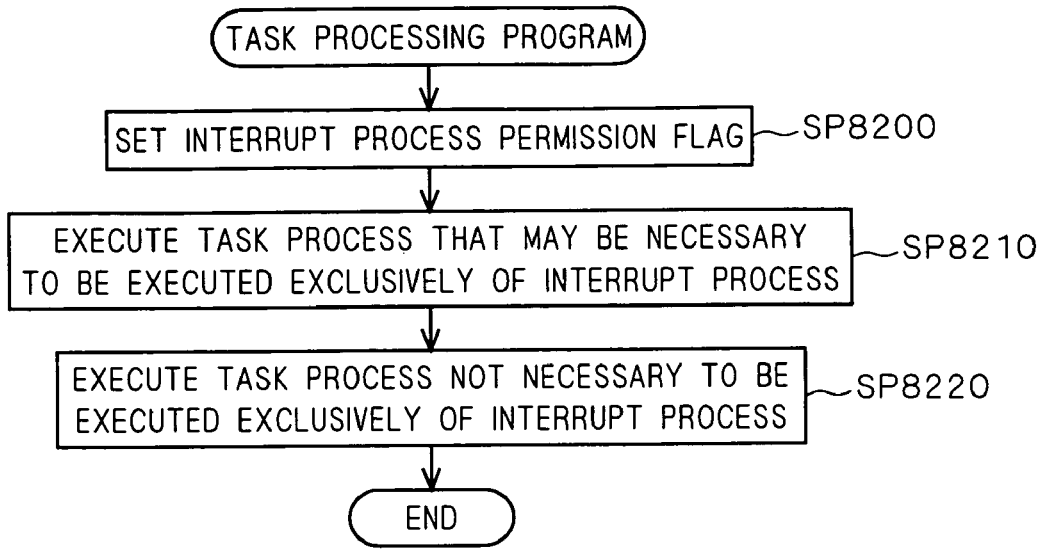
FIGS. 23 and 24 are flowcharts showing process flows in an interrupt controlling method according to an eighth preferred embodiment of the present invention.
Figure 24:
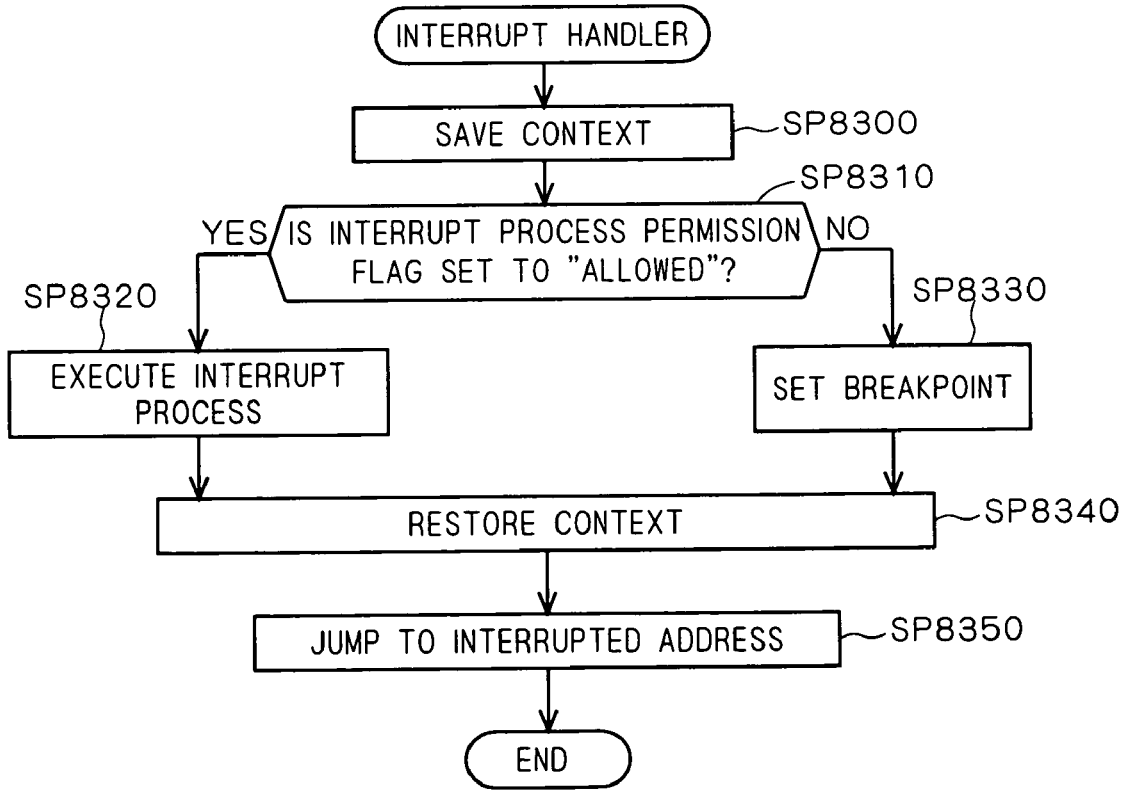

FIGS. 23 and 24 are flowcharts showing process flows in an interrupt controlling method according to an eighth preferred embodiment, based on the foregoing first preferred embodiment. An interrupt controlling device according to the eighth preferred embodiment performs the process of a task processing program shown in FIG. 23, in place of the process of the task processing program shown in FIG. 4. In addition, it executes the process of an interrupt handler shown in FIG. 24, in place of the process of the interrupt handler shown in FIG. 5.

Referring to FIG. 23, first, an interrupt process permission flag is set to indicate "enable" or "disable" in step SP8200. Next, in step SP8210, the microprocessor 1 executes a task process that may be necessary to be executed exclusively of interrupt processes. Thereafter, in step SP8220, the microprocessor 1 executes a task process that is not necessary to be executed exclusively of interrupt processes.

Referring to FIG. 24, in step SP8300, the microprocessor 1 saves the context in the microprocessor 1 that is immediately before proceeding to the interrupt handler. Next, in step SP8310, the microprocessor 1 judges whether or not the interrupt process permission flag is set to "enable".

If the result of the judgment in step SP8310 is "YES", that is, if the interrupt process permission flag is set to "enable", the process proceeds to step SP8320 and the microprocessor 1 immediately executes the interrupt process without performing a breakpoint setting process.

On the other hand, if the result of the judgment in step SP8310 is "NO", that is, the interrupt process permission flag is set to "disable", the process proceeds to step SP8330 and the microprocessor 1 sets a plurality of breakpoints in the interrupt process-enabled area R2, as in a similar manner to step SP1310 shown in FIG. 5.

Subsequent to step SP8320 or SP8330, in step SP8340, the microprocessor 1 restores the context that has been saved at step SP8300. Next, in step SP8350, the microprocessor 1 jumps to the interrupted address. This resumes the execution of the task processing program that has been suspended.

If the result of the judgment in step SP8310 is "NO", execution of the resumed task processing program soon reaches one of the plurality of breakpoints set in step SP8330. Then, as in the foregoing first preferred embodiment, an interrupt process is executed by the breakpoint handler shown in FIG. 6.

Although the explanation above has described an example in which the invention according to the eighth preferred embodiment is adopted based on the foregoing first preferred embodiment, but the invention according to the eighth preferred embodiment may be adopted based on the foregoing second to seventh preferred embodiments.

Thus, with the interrupt controlling method and the interrupt controlling device according to the eighth preferred embodiment, it is possible to select whether the task process and the interrupt process are executed mutually exclusively or non-exclusively, by setting of the interrupt process permission flag.

Ninth Preferred Embodiment

The reason why the task process and the interrupt process must be executed mutually exclusively is as follows. In a situation where there exists a variable that is accessed by both the task process and the interrupt process (i.e., there exists a global variable) and one of the processes changes the global variable while the other process refers to it, it is necessary to prevent that other process from performing a process using the global variable before the one finishes changing the global variable.

For example, consider a situation in which a task process changes a predetermined global variable G while an interrupt process refers to the global variable G. Here, in the task process, the following steps are executed in the order given below: a first step of loading the global variable G in a predetermined register, a second step of changing the set value in the register after a predetermined process is executed using the set value in the register, and a third step of rewriting the global variable G with the changed set value in the register. Here, if the interrupt process is executed using the global variable G before the third step is completed, a problem arises since the global variable G that has not yet changed is referred to.

This ninth preferred embodiment describes an interrupt controlling method and an interrupt controlling device that are capable of appropriately averting such a problem. For the sake of simplicity in explanation, the description takes an example in which there exists only one global variable G.

Figure 25:
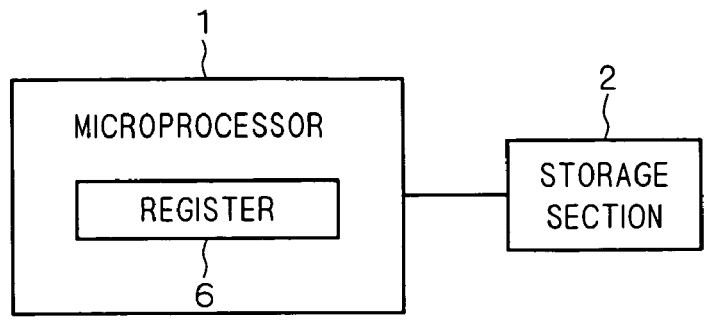
FIG. 25 is a block diagram schematically showing the configuration of an interrupt controlling device according to a ninth preferred embodiment of the present invention.

FIG. 25 is a block diagram schematically showing the configuration of an interrupt controlling device according to the ninth preferred embodiment. The microprocessor 1 has a predetermined register 6.

Figure 26:
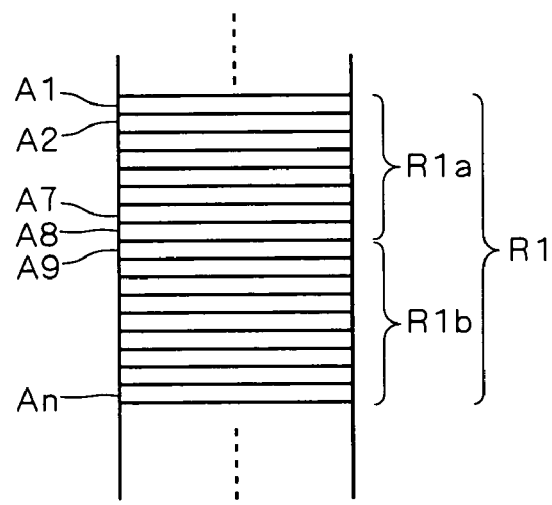
FIG. 26 is a schematic view showing a portion of the storage space selected in part from the storage section.

FIG. 26 is a schematic view showing a portion of the storage space selected in part from the storage section 2. The storage section 2 stores a plurality of instructions that constitute a task processing program, that is, a plurality of instructions for executing a task process. An address A1 stores an instruction for instructing the global variable G to be loaded into the register 6. An address A8 stores an instruction for instructing the global variable G to be replaced with the set value in the register 6. By the instructions stored in addresses A2 to A7, a process using the set value in the register 6 is executed, and thereafter, the set value in the register 6 is changed. By the instructions stored in the address A9 to An, the task process using the global variable G is not be executed. That is, the task process performed by executing the instructions stored in the addresses A9 to An is essentially a task process that is not necessary to be executed exclusively of interrupt processes.

FIGS. 27 to 30 are flowcharts showing process flows in an interrupt controlling method according to the ninth preferred embodiment. Hereinafter, the operation of an interrupt controlling device according to the ninth preferred embodiment is described with reference to FIGS. 25 to 30.

Figure 27:
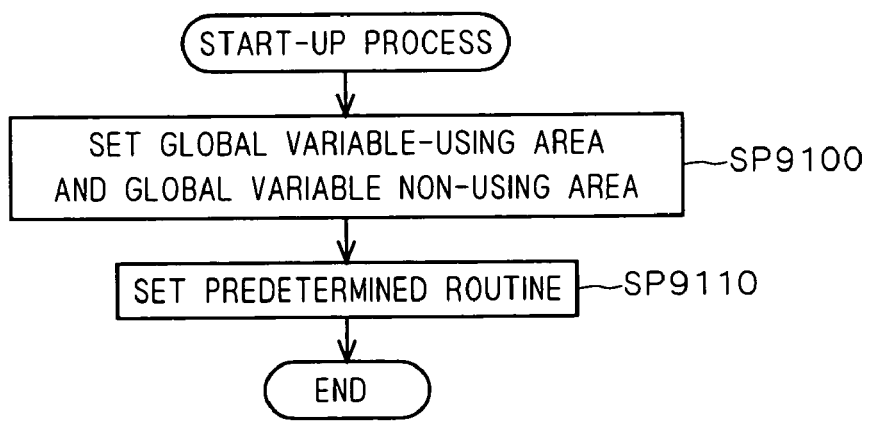

Referring to FIG. 27, first, a start-up process is executed only one time prior to execution of the task processing program. In step SP9100, the microprocessor 1 sets a global variable-using area and a global variable non-using area. The decision of which instructions are to be contained in the global variable-using area and which instruction are to be contained in the global variable non-using area may be made arbitrarily, for example, by the designer of the task processing program at the stage of designing the program. Identification information for identifying the global variable-using area and identification information for identifying the global variable non-using area are stored in a ROM of the storage section 2 in advance. Specifically, in step SP9100, the microprocessor 1 performs a process of loading the above-mentioned two identification informations and storing them in a RAM of the storage section 2. As a result of this, the global variable-using area and the global variable non-using area are defined. In the subsequent processes shown in FIGS. 28 to 30, the identification informations stored in the RAM of the storage section 2 are referred to when it is required to judge whether the instructions that make up the task processing program are in the global variable-using area or in the global variable non-using area.

Referring to FIG. 26, for example, the identification information for identifying the global variable-using area R1a is represented by the addresses A1 to A8 of the instructions that belong to the area, whereas the identification information for identifying the global variable non-using area R1b is represented by the addresses A9 to An of the instructions that belong to the area. Alternatively, if the global variable-using area and the global variable non-using area are made of a plurality of instructions having successive addresses, their identification information may be represented by the respective head addresses and end addresses of the global variable-using area and the global variable non-using area.

Figure 28:
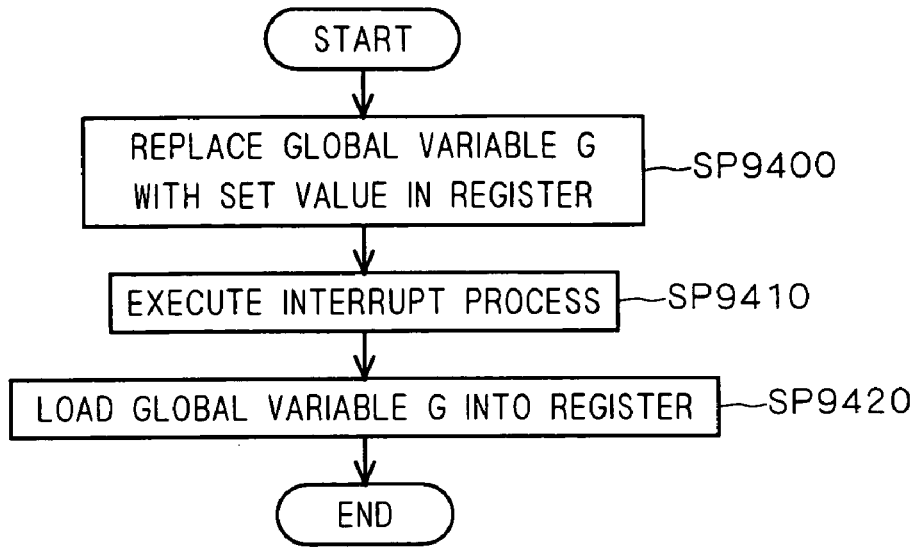

Next, in step SP9110, the microprocessor 1 registers a predetermined routine shown in FIG. 28. Referring to FIG. 28, in step SP9400, the global variable G is replaced with the set value in the register 6. In step SP9410, an interrupt process is executed using the global variable G that has been changed. In step SP9420, the global variable G is loaded into the register 6.

Figure 29:
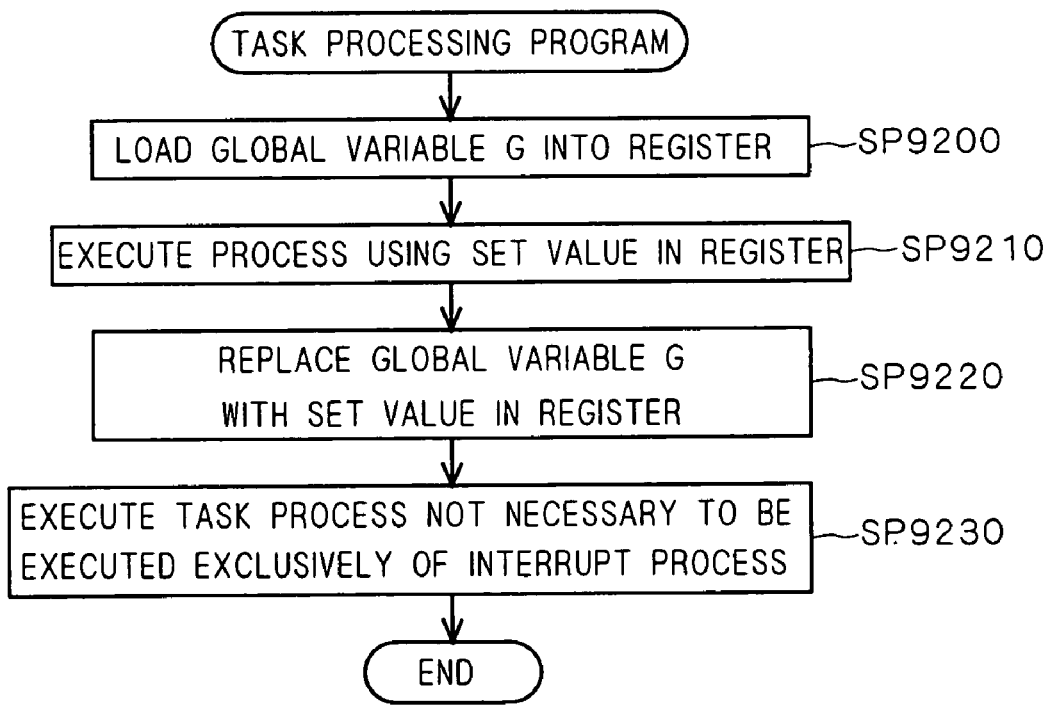

Referring to FIG. 29, execution of the task processing program is started after the start-up process is completed. In step SP9200, the microprocessor 1 loads the global variable G into the register 6. Next, in step SP9210, the microprocessor 1 executes a predetermined task process using the set value in the register 6. By this task process, the set value in the register 6 is changed. Then, in step SP9220, the microprocessor 1 replaces the global variable G with the set value in the register 6 that has been changed. Thereafter, in step SP9230, the microprocessor 1 executes the task process that is not necessary to be executed exclusively of interrupt processes.

It is assumed that an interrupt request occurs while the microprocessor 1 is executing the task processing program. Then, the microprocessor 1 suspends the execution of the task processing program and starts to execute an interrupt handler shown in FIG. 30.

Referring to FIG. 30, in step SP9300, the microprocessor 1 first saves the context in the microprocessor 1 that is immediately before proceeding to the interrupt handler. Next, in step SP9310, the microprocessor 1 obtains an address that stores the instruction that was in execution at the time the interrupt handler was started (that is, at the time the task processing program was suspended). Subsequently, in step SP9320, the microprocessor 1 judges whether or not the address obtained in step SP9310 is in the global variable-using area R1*a* shown in FIG. 26.

If the result of the judgment in step SP9320 is "NO", that is, if the address obtained in step SP9310 is in the global variable non-using area R1*b*, the process proceeds to step SP9330 and the microprocessor 1 executes the interrupt process.

On the other hand, if the result of the judgment in step SP9320 is "YES", that is, if the address obtained in step SP9310 is in the global variable-using area R1*a*, the process proceeds to step SP9340 and the microprocessor 1 calls and executes the routine shown in FIG. 28.

Subsequent to step SP9330 or SP9340, the processes of step SP9350 and SP9360 are executed as in a similar manner to the processes of step SP2350 and SP2360 shown in FIG. 7.

Thus, in the interrupt controlling method and the interrupt controlling device according to the ninth preferred embodiment, no additional processes (such as setting interrupt mask) that are added to the essential task processes are performed during normal operation in which no interrupt request occurs. Therefore, it is possible to avoid slowing-down in execution speed of the task processes because, unless an interrupt request occurs, the task processes do not suffer from overheads arising from exclusive control.

In addition, when an interrupt request occurs while one of the instructions in the global variable-using area R1*a* is being executed, a predetermined routine that has been registered in advance is called. In the routine, before execution of the interrupt process is started, the global variable G is replaced with the set value in the register 6. Consequently, by the time the interrupt process refers to the global variable G, the global variable G has already been replaced with the latest value updated by the task process. As a result, it is possible to avoid occurrence of the above-mentioned problem resulting from the interrupt process referring to the global variable G that has not yet been updated in an appropriate manner.

While the invention has been shown and described in detail, the foregoing description is in all aspects illustrative and not restrictive. It is therefore understood that numerous other modifications and variations can be devised without departing from the scope of the invention.

What is claimed is:

1. An interrupt controlling method of executing an interrupt process while executing a first program, in which instructions for performing a task process are described, said method comprising the steps of:
    (a) when an interrupt request occurs while said first program, in which first and second areas are defined, is in execution, suspending the execution of said first program and setting at least one breakpoint in said second area, wherein said first area is an area in which a task process to be executed exclusively of an interrupt process is described and said second areas is an area different from said first area;
    (b) resuming the execution of said first program that has been suspended in said step (a) after the setting of said breakpoint is completed;
    (c) when the execution of said first program that has been resumed in said step (b) reaches said breakpoint, suspending the execution of said first program and executing said interrupt process; and
    (d) clearing the setting of said breakpoint after the execution of said interrupt process is completed.

2. The interrupt controlling method according to claim 1, wherein:
    said at least one breakpoint includes a plurality of breakpoints;
    said second area contains a plurality of branch instructions; and
    in said step (a), said breakpoints are respectively set at a head address of said second area, an end address of said second area, and a plurality of addresses in which said plurality of branch instructions are stored.

3. The interrupt controlling method according to claim 1, wherein:
    said at least one breakpoint includes a plurality of breakpoints;
    said second area includes a plurality of branch instructions; and
    said step (a) has the steps of:
    (a-1) obtaining an address storing an instruction that was in execution at the time said first program was suspended;
    (a-2) if said address belongs to said first area, setting said breakpoints only at a head address of said second area;
    (a-3) if said address belongs to said second area, setting said breakpoints respectively at a head address of said second area, an end address of said second area, and a plurality of addresses thereof in which said plurality of branch instructions are stored.

4. The interrupt controlling method according to claim 1, further comprising the step of:
    (e) setting an interrupt process permission flag; and
    wherein:
    if said interrupt process permission flag is set to "enable", then execution of said first program is suspended and said interrupt process is executed without performing said steps (a) through (d) when said interrupt request occurs while said first program is in execution; and
    said steps (a) through (d) are executed in a situation where said interrupt process permission flag is set to "disable".

5. The interrupt controlling method according to claim 1, wherein the process for setting said breakpoint has the steps of:
    (x-1) saving a first instruction stored in a specific address at which said breakpoint is to be set; and
    (x-2) writing into said specific address a second instruction for instructing branching to a head address of a second program for executing said interrupt process.

6. The interrupt controlling method according to claim 5, wherein the process for clearing the setting of said breakpoint has the step of:
    (y) replacing said second instruction stored in said specific address with said first instruction.

7. The interrupt controlling method according to claim 1, wherein the process for setting said breakpoint has the step of:
    (x-1) setting, in a predetermined register, a specific address at which said breakpoint is to be set; and
    the process for suspending the execution of said first program has the steps of:
    (x-2) in a process of executing said first program, sequentially comparing an address set in a program counter with said specific address set in said predetermined register; and
    (x-3) setting, in said program counter, a head address of a second program for executing said interrupt process if said address set in said program counter matches said specific address set in said predetermined register.

8. The interrupt controlling method according to claim 7, wherein the process for clearing the setting of said breakpoint has the step of:
(y) clearing the setting of said predetermined register.

9. The interrupt controlling method according to claim 1, wherein the process for setting said breakpoint has the step of:
(x) setting by using a simulator, in a predetermined variable, a specific address at which said breakpoint is to be set.

10. The interrupt controlling method according to claim 9, wherein the process for clearing the setting of said breakpoint has the step of:
(y) clearing the setting of said predetermined variable.

11. An interrupt controlling method of executing an interrupt process while executing a first program, in which instructions for performing a task process are described, said method comprising the steps of:
(a) when an interrupt request occurs while said first program, in which first and second areas are defined, is in execution, suspending execution of said first program and obtaining an address that stores an instruction that was in execution at the time said first program was suspended;
(b) setting a breakpoint in said second area if said address belongs to said first area, but executing said interrupt process if said address belongs to said second area;
(c) subsequent to said step (b), resuming the execution of said first program that has been suspended in said step (a);
(d) if said address belongs to said first area in said step (b), suspending execution of said first program and executing said interrupt process when the execution of said first program that has been resumed in said step (c) reaches said breakpoint; and
(e) clearing the setting of said breakpoint after the execution of said interrupt process in said step (d) is completed.

12. The interrupt controlling method according to claim 11, wherein, in said step (b), said breakpoint is set at only at a head address of said second area.

13. The interrupt controlling method according to claim 11, further comprising the step of:
(f) setting an interrupt process permission flag; and wherein:
if said interrupt process permission flag is set to "enable", then execution of said first program is suspended and said interrupt process is executed without performing said steps (a) through (e) when said interrupt request occurs while said first program is in execution; and
said steps (a) through (e) are executed if said interrupt process permission flag is set to "disable".

14. The interrupt controlling method according to claim 11, wherein the process for setting said breakpoint has the steps of:
(x-1) saving a first instruction stored in a specific address at which said breakpoint is to be set; and
(x-2) writing into said specific address a second instruction for instructing branching to a head address of a second program for executing said interrupt process.

15. The interrupt controlling method according to claim 14, wherein the process for clearing the setting of said breakpoint has the step of:
(y) replacing said second instruction stored in said specific address with said first instruction.

16. The interrupt controlling method according to claim 11, wherein the process for setting said breakpoint has the step of:
(x-1) setting, in a predetermined register, a specific address at which said breakpoint is to be set; and
the process for suspending the execution of said first program has the steps of:
(x-2) in a process of executing said first program, sequentially comparing an address set in a program counter with said specific address set in said predetermined register; and
(x-3) setting, in said program counter, a head address of a second program for executing said interrupt process if said address set in said program counter matches said specific address set in said predetermined register.

17. The interrupt controlling method according to claim 16, wherein the process for clearing the setting of said breakpoint has the step of:
(y) clearing the setting of said predetermined register.

18. The interrupt controlling method according to claim 11, wherein the process for setting said breakpoint has the step of:
(x) setting by using a simulator, in a predetermined variable, a specific address at which said breakpoint is to be set.

19. The interrupt controlling method according to claim 18, wherein the process for clearing the setting of said breakpoint has the step of:
(y) clearing the setting of said predetermined variable.

* * * * *